Patented Mar. 25, 1930

1,751,848

UNITED STATES PATENT OFFICE

HERBERT A. WINKELMANN, OF AKRON, OHIO, ASSIGNOR TO THE B. F. GOODRICH COMPANY, OF NEW YORK, N. Y., A CORPORATION OF NEW YORK

RUBBER COMPOSITION AND METHOD OF PRODUCING THE SAME

No Drawing. Application filed November 17, 1924. Serial No. 750,463.

This invention relates to the vulcanization of rubber, and like substances, and has for its object to produce a vulcanized-rubber product, and a process for making the same, which rubber product shall have improved physical properties, particularly improved aging properties.

It has been known for some time that rubber mixes containing hard hydrocarbons derived from certain natural bitumens give to the rubber mixes an increased fluidity and provide a smoother extruded or calendered product. A desirable characteristic of these substances has been their softness combined with an absence of tackiness. Substances of this kind heretofore used, however, have been practically inert in their influence on the vulcanized product and are generally considered merely as filters.

I have found that blown products of mixed petroleum residues or other bitumens of the asphaltic or semi-asphaltic type, heretofore not used in the compounding of rubber, which have certain physical characteristics hereinafter more fully described, may be compounded with rubber to produce on vulcanization a rubber having marked improved physical properties, such as increased snap, stiffness, tensile strength, resistance to tear and abrasion, and especially characteristic are the improved aging properties of these new rubber products.

The still residues after distillation by steam, or other methods of heat application, of crude petroleums of asphaltic or semi-asphaltic bases are commonly known in the trade as "fluxes", a term which is hereinafter employed to designate such residues. Fluxes and certain other asphaltic bitumens when subjected to heat and to agitation by blasts of air blown therethrough undergo chemical changes, the character of which is not completely known but is generally considered to include, with other reactions, polymerization and oxidation, the result of this "blowing" being to form more or less solid hydrocarbon products, commonly known as blown asphalts.

It is with the compounding in rubber products of hard blown products of fluxes and asphaltic bitumens that the present application has to do, and, for brevity and convenience of expression in the present specification and claims, these hard-blown hydrocarbons are termed herein "blown products".

I have discovered that blown products which have the combined physical characteristics of a high softening point and a relatively low penetration give to vulcanized rubber products, when mixed therewith before vulcanization in the manner hereinbelow described, marked improved physical characteristics, particularly greatly improved aging properties. Blown fluxes of petroleums from different fields, however, are found to differ quite widely in physical characteristics. This is readily demonstrated by blowing different fluxes to a constant softening point and testing for the hardness of such products. Thus, as Illinois flux blown to such degree as to have a softening point of 300° F., has a penetration at 122° F. of 64, while a Mexican flux blown to the same softening temperature has a penetration of 21, and a California flux a penetration of 6. I find that best results are obtained by the use of blown fluxes in rubber compounds where the blown products have the combined physical characteristics of a softening temperature of 300° F. and a penetration not in excess of 16 at 122° F. These blown products are preferably added to the rubber compound in amounts varying from 5 to 25 parts of the blown product to 100 parts of rubber.

Blown products having the characteristics above described may be obtained by a suitable blending of different asphalts. Thus, 60 parts by weight of Illinois or mid-continental flux and 40 parts by weight of California flux may be made to yield, when blown, a product having a softening temperature of 300° F. and a penetration of approximately 16. Similarly, mixed fluxes consisting of 40 parts by weight of Illinois flux and 60 parts by weight of California flux are capable of yielding a blown product having the same softening temperature and a penetration of approximately 14; while a mixture of 75 parts by weight of Mexican flux and 25 parts by weight of gilsonite may be made to yield a blown product having a softening temperature of 300° F. and a penetration of 12. Mixtures of these bitumens in varying proportion, or of other similar bitumens of asphaltic origin, which will yield blown products having the desired range of properties for producing beneficial results in vulcanized rubber compounded therewith, namely, a penetration not in excess of 16, preferably ranging from 8 to 16, and a softening temperature of approximately 300° F., are also intended to be included within the scope of the present invention. Where the penetration of the blown product is materially lower than 8 for this softening temperature, I find that a vulcanized rubber compounded therewith has a somewhat objectionable high degree of set and the hysteresis losses are high on test, and where the penetration of the blown product is materially higher than 16 for a softening temperature of 300° F., a vulcanized rubber compounded therewith is not materially improved in its aging properties.

For example, a rubber compound of the following composition, into which the blown product of Illinois flux, 60 parts by weight, and of California flux, 40 parts by weight, was mixed before vulcanization, was found upon vulcanization (for 50 minutes at 294° F.) to have improved tensile, increased wear and tear qualities and greatly superior aging properties:

| | |
|---|---|
| Rubber | 100 |
| Zn oxide | 25 |
| Gas black | 27 |
| Sulphur | 5 |
| Diphenylguanidine | 1.2 |
| Blown product | 10 |

In the same rubber compound, the blown product above described was replaced by the following blown products of mixed fluxes and the vulcanized rubber products resulting therefrom tested: (1) a mixture of 60% California flux and 40% mid-continental or Illinois flux; and (2) a mixture of 75% Mexican flux and 25% gilsonite. The vulcanized products obtained from the vulcanization of each of these rubber compounds showed on test the same superior aging and other properties as when the blown product of the above example was employed.

The present invention is intended to include not only the blown products herein specifically described but also equivalent blown products, that is, those which are capable upon blowing of attaining substantially the same combined characteristic physical properties as the blown products herein recited. It is not essential, however, that the blown product actually employed in the compounding of the rubber mixes in the above examples shall, when compounded, have a softening point of the definite temperature above indicated, since softening points varying somewhat widely from 300° F. may be employed, the relation of the softening point and penetration herein set forth being definitive of the character of the blown products which have been found best adapted to produce the improved vulcanized rubber products herein described.

The numerical values indicating the softening point and the penetration of the blown products of the specification and claims are those determined by the methods adopted by the American Society for Testing Materials, commonly known as the A. S. T. M. Standards, and may be found in the 1921 edition of the A. S. T. A. M. Standards, published by this society.

The softening point is determined by the cube-in-air method, a cube of the blown product being suspended in an air bath during the gradual heating thereof. The temperature of the softening point is that of the air at the moment the first drop or portion of the material of the cube touches the bottom of the air bath when the cube is suspended one inch from the bottom thereof, as is well understood by those versed in this art. A full discussion of the cube method employing an air bath is given in Abraham's "Asphalts and allied substances" published by D. Van Nostrand Company of New York city, at page 515.

The penetration point is also that determined by the standard penetrometer and is the distance that a standard needle vertically penetrates a sample of material under standard conditions of loading, time and temperature, that is, 100 g., 5 seconds, and 50° C. (122° F.), expressed in hundredths of a centimeter. A concise description of the standard penetration test is given in Abraham's work, above referred to, at pages 495 to 497.

The procedure and product herein described and claimed is subject to modification as to the proportions of the blown product employed in the compounding of the vulcanizable rubber. The essentials of any compound of which my improved rubber products are made consist of rubber of any of its various grades, sulphur, and a blown product of mixed hydrocarbons which are capable of producing a blown product having the combined physical properties of a softening point of 300° F. and a penetration not in excess of 16, which rubber compound may or may not have mixed therewith other ingredients commonly employed in rubber compounding, such, for example, as zinc oxide, litharge, accelerators, pigments and other fillers.

Modifications may be resorted to within the scope of this invention and I do not wholly limit my claims to the specific procedure or products herein described.

I claim:

1. The method of improving the aging properties of rubber on vulcanization with sulphur which comprises adding to a rubber mix before vulcanization a blown product of the distillate residues of petroleum capable of producing a blown product having the combined properties of a softening point of substantially 300° F. and a penetration at 122° F. of between 8 and 16, and vulcanizing the resulting mixture with the production of a vulcanized rubber product having improved aging properties.

2. The method of improving the physical properties of rubber which comprises adding to a rubber mix before vulcanization a blown product of bitumens of petroleum origin or of asphalt type, the blown product having a low penetration of the order of 8 to 16 when the blowing action is carried to a point which produces a blown product having a softening point not substantially in excess of 300° F. and vulcanizing the resulting mixture with the production of a vulcanized soft-rubber product having improved aging properties.

3. The method of improving the vulcanization of rubber which comprises adding to a rubber mix before vulcanization, a blown product of mixed hydrocarbons containing in part the distillate residue of California petroleum and in part the distillate residue of mid-continental petroleum, either residue being not less in amount than ⅓ of the other residue.

4. Vulcanized rubber resulting from the vulcanization of a rubber mixture containing before vulcanization sulphur, substances capable of promoting vulcanization, and a blown product of distillate residues of petroleum which are capable of giving to the blown product a penetration ranging from 8 to 16 when the blowing action is carried to a point which produces a product having a softening point of substantially 300° F.

5. Vulcanizing rubber resulting from the vulcanization of a rubber mixture containing before vulcanization sulphur, substances capable of promoting vulcanization, and a blown product of mixed hydrocarbons consisting in part of the distillate residue of California petroleum and in part of the distillate residue of mid-continental petroleum, either residue being not less in amount than ⅓ of the other residue.

6. Vulcanized rubber resulting from the vulcanization of a rubber mixture containing before vulcanization sulphur, substances capable of promoting vulcanization, and a blown product of mixed hydrocarbons consisting in part of the distillate residue of petroleum and in part of a bitumen of petroleum orign or asphalt type in such proportions as to give to the blown product a low penetration of the order of 8 to 16 when the blowing action is carried to a point which produces a blown product having a softening point of substantially 300° F.

7. The method of improving the physical properties of rubber which comprises adding to a rubber mix before vulcanization a blown product of bitumens of petroleum origin or of asphalt type, including the distillate residue of California petroleum, the blown product having a penetration not in excess of 16 when the blowing action is carried to the point which produces a blown product having a softening point not substantially in excess of 300° F., and vulcanizing the resulting mixture with the production of a vulcanized soft-rubber product having improved aging properties.

8. The method of improving the vulcanization of rubber which comprises adding to a rubber mix before vulcanization a blown product of mixed hydrocarbons containing in part the distillate residue of California petroleum in an amount not less than ⅓ of the mixed hydrocarbons.

9. Vulcanized rubber resulting from the vulcanization of a rubber mixture containing before vulcanization sulphur, substances capable of promoting vulcanization, and a blown product of mixed distillate residues of California and other petroleums capable of giving to the blown product a penetration ranging from 8 to 16 when the blowing action is carried to a point which produces a product containing a softening point of substantially 300° F.

10. Vulcanized rubber resulting from the vulcanization of rubber mixture containing before vulcanization sulphur, substances capable of promoting vulcanization, and a blown product of mixed hydrocarbons consisting in part of the distillate residue of California petroleum and in part of a bitumen of petroleum origin or asphalt type in such proportions as to give the blown product a penetration not in excess of 16 when the blowing action is carried to a point which produces a blown product having a softening point of substantially 300° F.

In witness whereof I have hereunto set my hand this 14th day of November, 1924.

HERBERT A. WINKELMANN.